United States Patent [19]

Lind

[11] 4,077,063
[45] Feb. 28, 1978

[54] APPARATUS FOR RAPIDLY DETERMINING THE TRIGONOMETRIC FUNCTIONS OF AN INPUT ANGLE

[75] Inventor: Thomas Peter Lind, Santa Clara, Calif.

[73] Assignee: The Singer Company, Binghamton, N.Y.

[21] Appl. No.: 713,562

[22] Filed: Aug. 11, 1976

[51] Int. Cl.² .............................................. G06F 15/34
[52] U.S. Cl. .................................................. 364/729
[58] Field of Search ......................... 235/152, 197, 186

[56] References Cited

U.S. PATENT DOCUMENTS

| | | | |
|---|---|---|---|
| 3,569,684 | 3/1971 | Burnett | 235/152 |
| 3,735,110 | 5/1973 | Le Comte | 235/197 |
| 3,813,528 | 5/1974 | Blanding | 235/152 |
| 3,898,446 | 8/1975 | Vatz | 235/156 |

*Primary Examiner*—David H. Malzahn
*Attorney, Agent, or Firm*—Paul Hentzel; James C. Kesterson

[57] ABSTRACT

High-speed hardware is employed to:
(1) subdivide an input angle into a series of smaller subangles according to the sine approximation algorithm:

$$SIN(INPUT) \simeq SIN(A) + COS(A)SIN(B) + COS(A)SIN(C) + COS(A)SIN(D);$$

(2) process the above terms separately through individual look-up tables; and
(3) sum the table results to provide the sine function of the input angle.

The above algorithm is derived from a series of approximations relating to the sine and cosine functions of very small angles. The relative sizes of the above subangles is expressed by:

$$A >> B > C > D$$

The actual size of each subangle is dependent on the number of input bits, the size of the look-up tables available, and the accuracy desired.

14 Claims, 4 Drawing Figures

Fig_1

Fig_3

APPARATUS FOR RAPIDLY DETERMINING THE TRIGONOMETRIC FUNCTIONS OF AN INPUT ANGLE

BACKGROUND OF THE INVENTION

1. Field of the Invention

This invention relates to determining the trigonometric functions of an input angle, and more particularly to reducing the hardware requirement of the above determination by dividing the input angle into a series of smaller subangles.

2. Discussion of the Prior Art

Heretofore, software has been employed in an iterative process to develop the sine function from the infinite series:

$$SINE(X) = \frac{X^3}{3!} + \frac{X^5}{5!} - \frac{X^7}{7!} + \ldots$$

This software infinite series approach is slow, especially as the infinite series is expanded to fulfill higher accuracy requirements.

Simple hardware look-up tables have been employed to provide the trigonometric functions in low accuracy applications. As input bits (Nin) are added to provide more accuracy, the number of address locations in the look-up table doubles according to the relationship:

$$\text{\# of locations} = 2^{(input\ places)} = 2^{Nin}$$

An application having 20 input bits (Nin = 20) will require over 1,000,000 ROM locations. The hardware look-up technique is a great deal faster than the software infinite series technique, but is lacking in accuracy for reasonable hardware commitments.

U.S. Pat. No. 3,813,528 to Curtis Blanding entitled "High-Speed Function Generator" teaches a look-up table technique for providing trigonometric functions in which the input angle is divided into two smaller angles according to the trigonometric identity:

$$SIN(I+II) = SIN(I)COS(II) + COS(I)SIN(II)$$

SUMMARY OF THE INVENTION

It is therefore an object of this invention to provide the trigonometric functions of a binary input angle by subdividing the input angle into a series of progressively decreasing subangles formed by consecutive groups of binary places.

It is another object of this invention to rapidly and accurately provide the sine trigonometric function of a series of subangles with less hardware.

It is a further object of this invention to rapidly and accurately provide the approximate sine function in accordance with an algorithm derived from approximations concerning the sines and cosines of very small angles.

It is still a further object of this invention to rapidly and accurately provide the sine function from a monotonic approximate sine algorithm.

BRIEF DESCRIPTION OF THE DRAWING

Further objects and advantages of the present invention and the design and operation of the sine look-up tables will become apparent to those skilled in the art from the following detailed descriptions taken in conjunction with the drawings in which.

GENERAL EMBODIMENT

Figure 1:
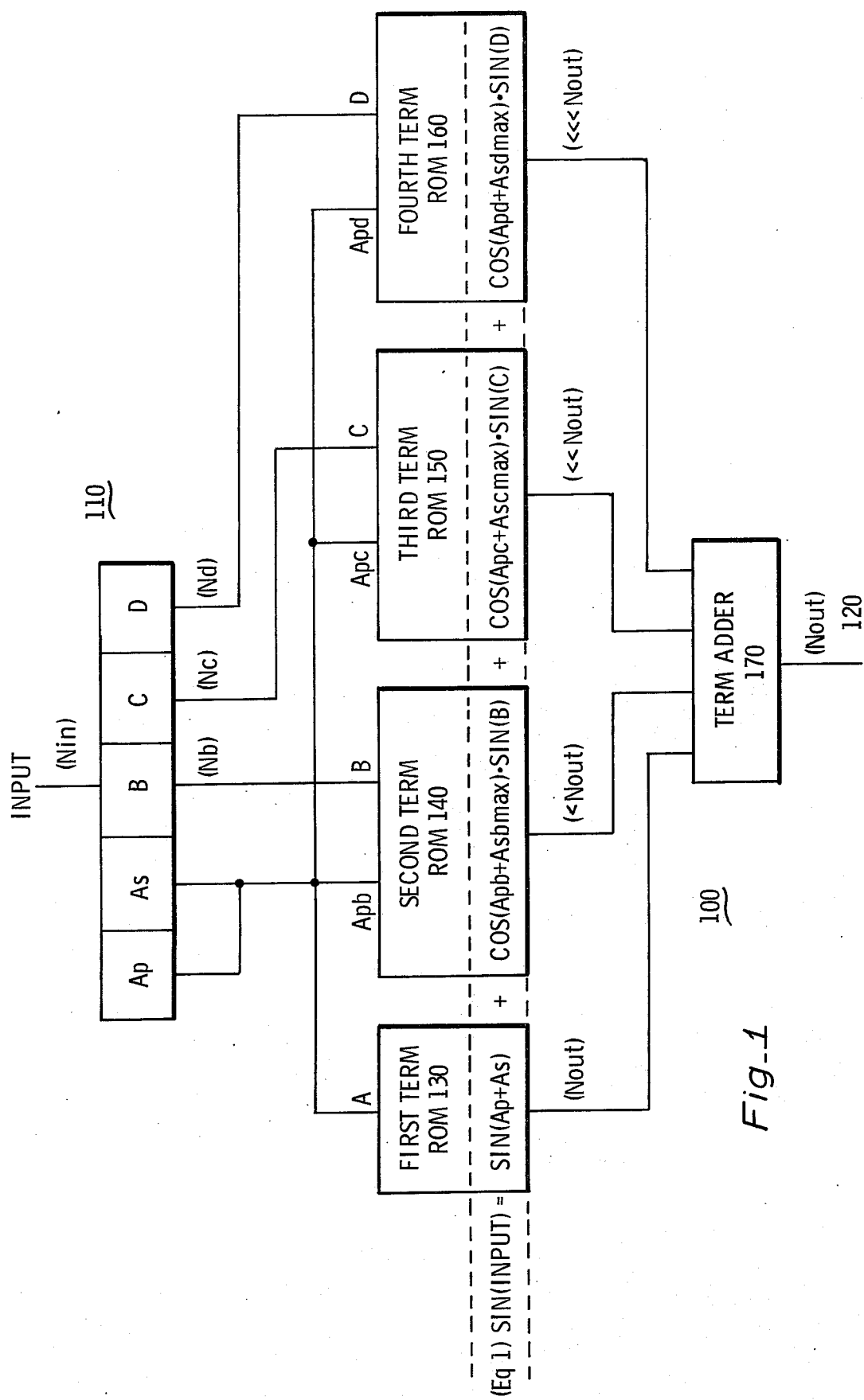
FIG. 1 is a block diagram showing the hardware required to implement a sine approximation algorithm having four subangles.

FIG. 1 shows a block diagram of sine function generator 100 which receives a binary input angle (INPUT) at input 110, and provides SIN(INPUT) at output 120. INPUT has Nin binary bits which ae in this embodiment hardwire-divided into four progressively smaller subangles A, B, C and D by assigning the most significant group of bits (Na) to form A which is the largest of the subangles, and assigning the next most significant group of bits (Nb) to form B, etc. . . . and assigning the least significant group of bits (Nd) to form D which is the smallest of the subangles. That is:

$$INPUT = A + B + C + D,$$

$$INPUT >> A > B > C > D,\ \text{and}$$

$$Nin = Na + Nb + Nc + Nd$$

Each subangle is formed by consecutive groups of binary places from the input angle. The four subangles are forwarded to look up ROMs 130, 140, 150 and 160 to form the four terms of the sine approximation algorithm:

$$\begin{aligned}SIN(INPUT) \approx\ &SIN(Ap + As) + COS(Apb + \\&Asbmax)SIN(B) + COS(Apc + Ascmax)SIN(C) + \\&COS(Apd + Asdmax)SIN(D)\end{aligned} \quad (Eq.\ 1)$$

The output of the four ROMs are summed by term adder 170 to form SIN(INPUT) having Nout bits at output 120.

In the above sine approximation algorithm (Eq. 1) subangle A of the first term has been further hardwire-divided into a primary portion (Ap) formed by the MSBs of A and a secondary portion (As) formed by the remaining LSBs of A. The other terms similarly have primary portions Apb, Apc and Apd formed by the MSBs of subangle A, and secondary portions Asb, Asc and Asd formed by at least a portion of the remaining LSBs of subangle A. A constant or preassigned value has been substituted for the secondary portions in order to minimize the number of address locations required by the ROMs. For each variable bit input of subangle A in a term that is replaced by a constant, the number of address locations required by the ROM for that term is decreased by half in accordance with the relationship:

$$\text{address locations} = 2^{(bits\ of\ variable\ input)}$$

More specifically, for the second term COS(Apb + Asbmax)SIN(B):

$$\text{ROM 140 locations} = 2^{(Apb + Asb + B)}$$

Letting Asb become fixed at Asbmax reduced the address requirement to:

ROM 140 locations = $2^{(Apb + B)}$

The preassigned value of each secondary term is preferably the maximum value which permits the sine approximation algorithm (Eq. 1) to maintain its monotonicity; that is, the ability of the relationship to increase in a continuous manner in response to greater and greater values of INPUT. The number of bits in the variable primary portions of A and in the fixed secondary portions of A in each term may vary with each application depending on the space and accuracy requirements.

Derivation of the Sine Approximation Algorithm (Eq. 1)

The algorithm of Eq. 1 is derived from the basic trigonometric identity:

$$SIN(I + II) = SIN(I)COS(II) + COS(I)SIN(II) \quad (Eq. 2)$$

by employing three approximations as described below. First let, $I + II = INPUT =$ series of subangles $A + B + C + \ldots + LAST - 1 + LAST$ where $INPUT \gg A > B > C > \ldots > LAST - 1 > LAST$ and I (a large angle) = A
II (a small angle) = $B + C + \ldots + LAST - LAST$ Reducing the subangles series to four members for illustrative purposes yields:

$$SIN(INPUT) = SIN(A)COS(B + C + D) + COS(A)SIN(B + C + D) \quad (Eq. 3).$$

Because the cosine of the very small angle $B + C + D$ approaches unity (approximation one), the $COS(B + C + D)$ in Eq. 3 may be replaced by "1" which yields:

$$SIN(INPUT) \approx SIN(A) + COS(A)SIN(B + D + D) \quad (Eq. 4)$$

Second, because the sine of the very small angle $B + C + D$ in radians approaches the numerical value of $B + C + D$ (approximation two), $SIN(B + C + D)$ may be replaced by $SIN(B) + SIN(C) + SIN(D)$, which yields:

$$SIN(INPUT) \approx SIN(A) + COS(A)SIN(B) + COS(A)SIN(C) + COS(A)SIN(D) \quad (Eq. 5)$$

Third, A in each term is subdivided into a variable primary portion $Ap$- and a fixed secondary portion $As$- which yields:

$$SIN(INPUT) \approx SIN(Ap + As) + COS(Apb + Asb)SIN(B) + COS(Apc + Asc)SIN(C) + COS(Apd + Asd)SIN(D) \quad (Eq. 6)$$

Setting each fixed secondary portion $As$- of Eq. 6 to the maximum value permitted by the number of binary places therein (approximation three), results in the sine approximation algorithm (Eq. 1).

Four Subangle Embodiments with Nin = 20

The input bits may be distributed over the series of progressively smaller subangles in many ways. For $Nin$ = 20, the input bits are preferably distributed over a four member subangle series as follows:

| A | B | C | D |
|---|---|---|---|
| 1-2-3-4-5-6-7-8-9 | 10-11-12 | 13-14-15-16 | 17-18-19-20 |
| First Term - | A has 9 bits (Na=9) | | |
| Second Term - | B has 3 bits (Nb=3) | | |
| | Apb has 6 bits | | |
| | Asbmax has 3 bits | | |
| Third Term - | C has 4 bits (Nc=4) | | |
| | Apc has 5 bits | | |
| | Ascmax has 4 bits | | |
| Fourth Term - | D has 4 bits (Nd=4) | | |
| | Apd has 5 bits | | |
| | Asdmax has 4 bits | | |

The fixed bits of the A secondary portions of each term do not require corresponding address locations within the ROMs. The sum of the variable bits of each term is nine and ROM address locations = 2 (number of variable bits)
= $2^9$
= 512

Four ROMs having 512 address locations of Nin bits each is just the right size to accommodate the above four-term, $Nin = 20$ embodiment.

Larger ROMs can handle more variable bits, permitting larger primary portions of A (variable) and smaller secondary portions of A (fixed) which results in a more accurate SIN(INPUT) at output 120.

Effect of Eq. 1 Approximations on Reduction in ROM Size

Figure 2:
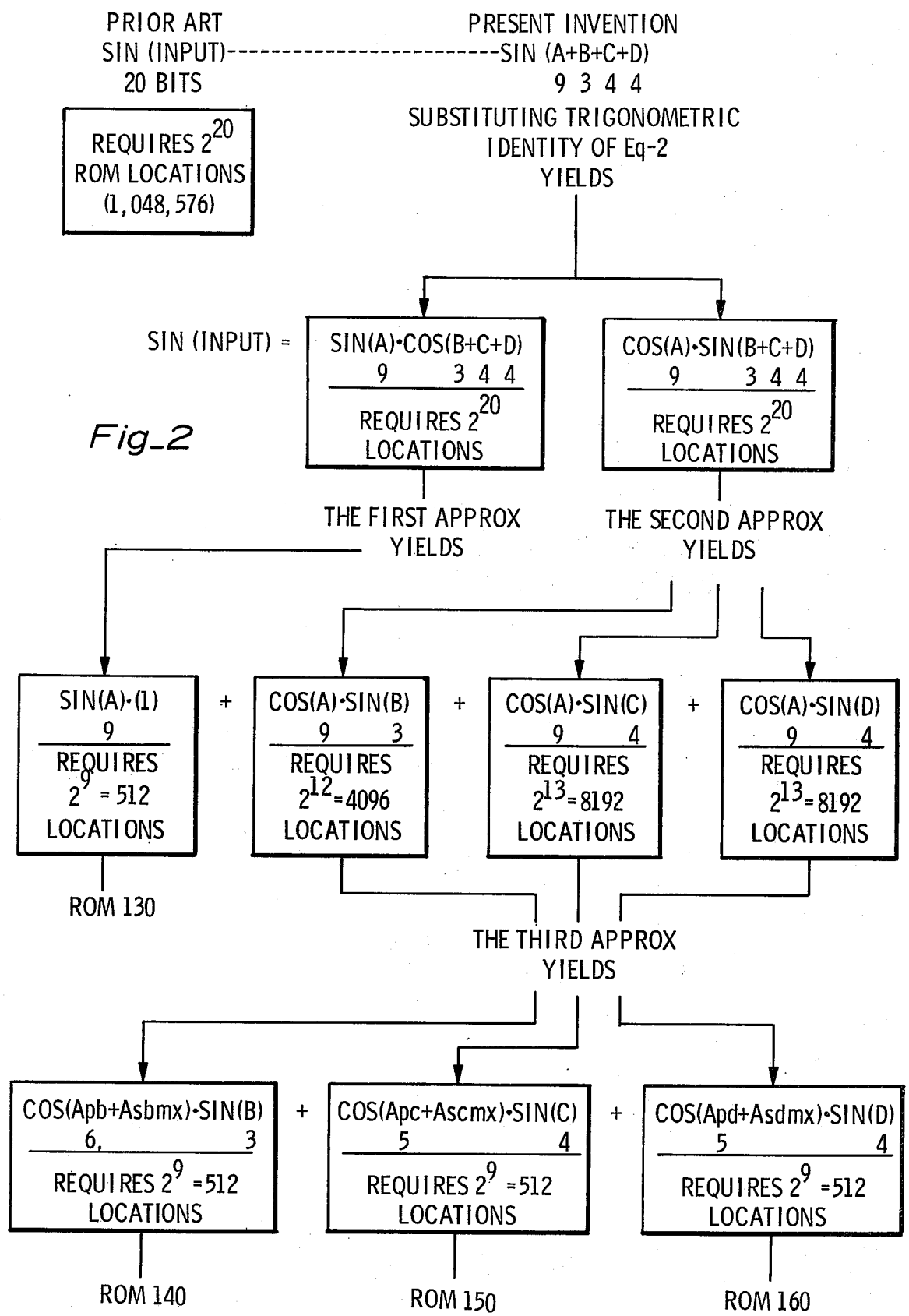
FIG. 2 is a chart showing the reduction in ROM address locations effected by each of the approximations employed in deriving the sine approximation algorithm (Eq. 1)

FIG. 2 shows a flow chart illustrating the ROM size required by the prior art hardware approach, and the reduction thereof as a result of each approximation in the present invention. Assuming a 20-bit INPUT ($Nin$ = 20) the single-angle prior art approach would require a ROM with 2 to the 20th locations, or 2048 ROM's with 512 locations. The present invention reduced this requirement by a factor of 512 to only four ROMs (one for each term of Eq. 1) with 512 locations each. Initially the substitution of the trigonometric identity (Eq. 2) produces Eq. 3 having two initial terms, each requiring 2 to the 20th locations.

Approximation one is applied to the first initial term of Eq. 3 (which becomes the first term of Eq. 1) eliminating subangle B (3 bits), subangle C (4 bits), and subangle D (4 bits). The elimination of eleven bit places reduces the first term ROM requirement by a factor of 2096 (2 to the 11th) to a ROM size of 512 (2 to the 9th).

Approximation two is applied to the second initial term generating three new terms having fewer bit places of input data and which require 4096, 8192, and 8192 ROM locations respectively.

Approximation three is applied to the above three new terms eliminating input bits by rounding off the least significant bits of the secondary portion $As$- of each term to a fixed value. For each rounded-off bit, the ROM location requirement is reduced by half. The number of rounded-off or fixed bits may vary with each term depending on the accuracy and hardward requirements.

In the first new term (which becomes the second term of Eq. 1), three of the nine bits of subangle A are fixed in the secondary portion $Asbmax$, leaving six variable bits in the primary portion A$pb$. These six bits of A$pb$ plus three more bits of subangle B form nine bits of variable input which require only 512 (2 to the 9th) ROM locations.

In the second new term (which becomes the third term of Eq. 1), four of the nine bits of subangle A are fixed in A$scmax$ leaving five variable bits for A$pc$. These five variable bits plus four additional variable bits of subangle C require only 512 ROM locations.

Similarly the third new term (which becomes the fourth term of Eq. 1) is reduced to five variable bits in A$pd$ and four variable bits in subangle D requiring only 512 ROM locations.

Discussion of Error Introduced by Approximations One, Two and Three

Figure 3:
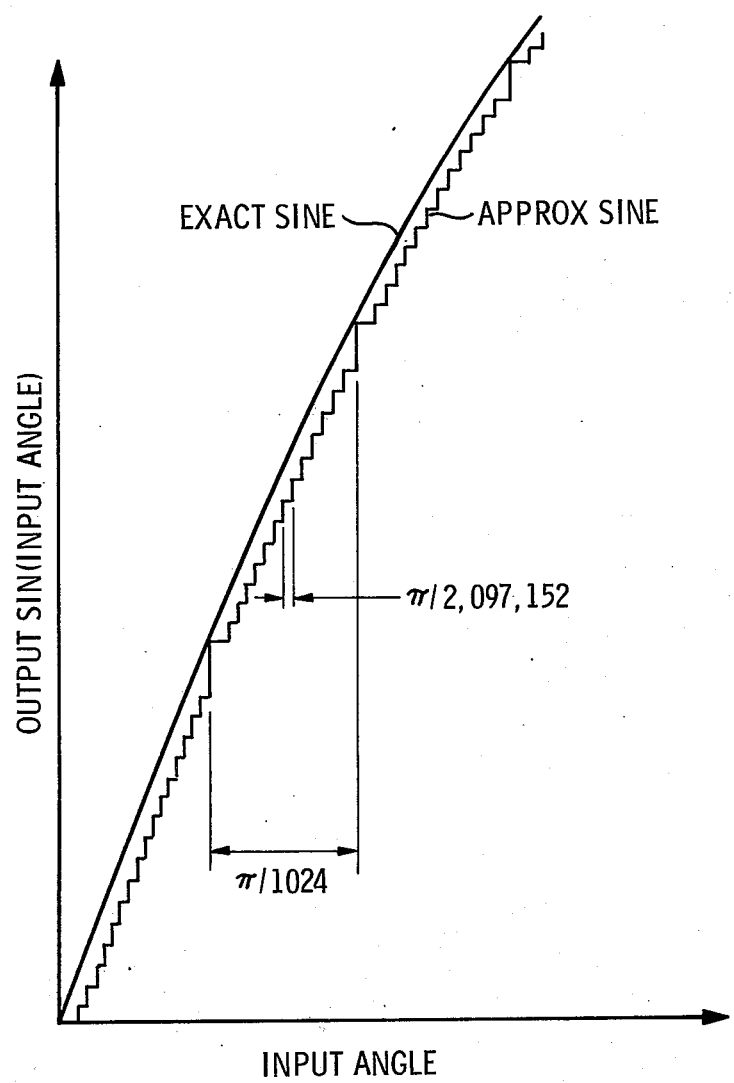
FIG. 3 is a portion of the exact sine and the approximate sine (Eq. 1) plotted against the input angle.

FIG. 3 shows a portion of the exact sine function and the sine approximation algorithm (Eq. 1) plotted against the input angle. The slight error introduced by approximations one, two and three is periodically cummulative causing the approximation algorithm to periodically drift off and return to the exact sine function. The algorithm is identical to the exact function at the start and finish of each subangle A (the A$p$ + A$s$ subterms of the first term of Eq. 1). This no-error condition occurs each time all of the binary places of the second, third and fourth terms are zero. These latter terms contain all of the error introduced by the approximation. The first term is always error-free. The no-error condition occurs at multiples of subangle A which are equally spaced at:

$$\text{Angle between error-free points} = \frac{\frac{1}{2}\pi}{2^{Na}} = \frac{\pi}{4 \cdot 2^9} = \frac{\pi}{1024} \text{ radians}$$

The staircase effect between the no-error points is caused by the inherent quantization of the LSB of INPUT. There are $$2^{(Nb + Nc + Nd)} = 2^{11} = 4096$$

steps or LSB increments between each error-free point, and the LSB increment angle is:

$$\frac{\frac{1}{2}\pi}{2^{Nin}} = \frac{\pi}{2 \cdot 2^{20}} = \frac{\pi}{2{,}097{,}152}$$

The assigned values to A$s-max$ causes the error to accumulate between error-free points causing the LSB increment staircase to drift away from the exact sine function. This drift is restored by a major correct at each error-free point. The monotonicity of the approximate sine algorithm (and also of the exact sine function) is apparent from FIG. 3. That is, the algorithm increases with increasing INPUT, and never decreases as INPUT increases.

Approximations one and two in terms 2, 3 and 4 rely on properties of small angle cosines (i.e. subangles B, C and D) and the resulting error is dependent on how Nin is allocated between (N$a$) and (N$b$ + N$c$ + N$d$). The error incident to approximations one and two may be reduced by assigning more input bits to subangle A.

Approximation three in terms 2, 3 and 4 relies on the inherent loss of LSBs through the multiplication involved in each of these terms. The LSBs of subangle A in these terms can be rounded off or have preassigned values as in the case of A$s-max$, without significant error because the product of these LSBs falls beyond the truncation point. The slight preassigned value error is even less as the size of the subangles decreases. As a result, latter terms of (Eq. 1) can absorb greater approximations (more fixed bits) without sustaining a significant increase in error. In general then, the number of rounded-off bits in each secondary portion A$s-$ of subangle A may increase as the significance of the terms decreases. That is:

$$Nasb \leq Nasc \leq \ldots Naslast - 1 \leq Naslast$$

It necessarily follows that the number of variable bits in the remaining portion A$p-$ of subangle A decrease as the significance of the terms decreases:

$$Napb \geq Napc \geq \ldots Naplast - 1 \geq Naplast$$

The number of input places assigned to subangle A in each ROM may decrease without significant increases in round-off error; and more of the ROM input places may be assigned to the other subangle of each term permitting a larger Nin without additional hardware. Assuming a uniform ROM size for each term of (Eq. 1) expressed by $$Napb + Nb = Napc + Nb = \ldots Naplast + Nlast,$$

and a decreasing input place allocation to the variable portion A$p-$ of subangle A expressed by:

$$Napb \leq Napc \leq \ldots Naplast,$$

then an increasing number of input places are available for the other subangle in each term:

$$Nb \leq Nc \leq \ldots Nlast$$

General Purpose Embodiment

Figure 4:
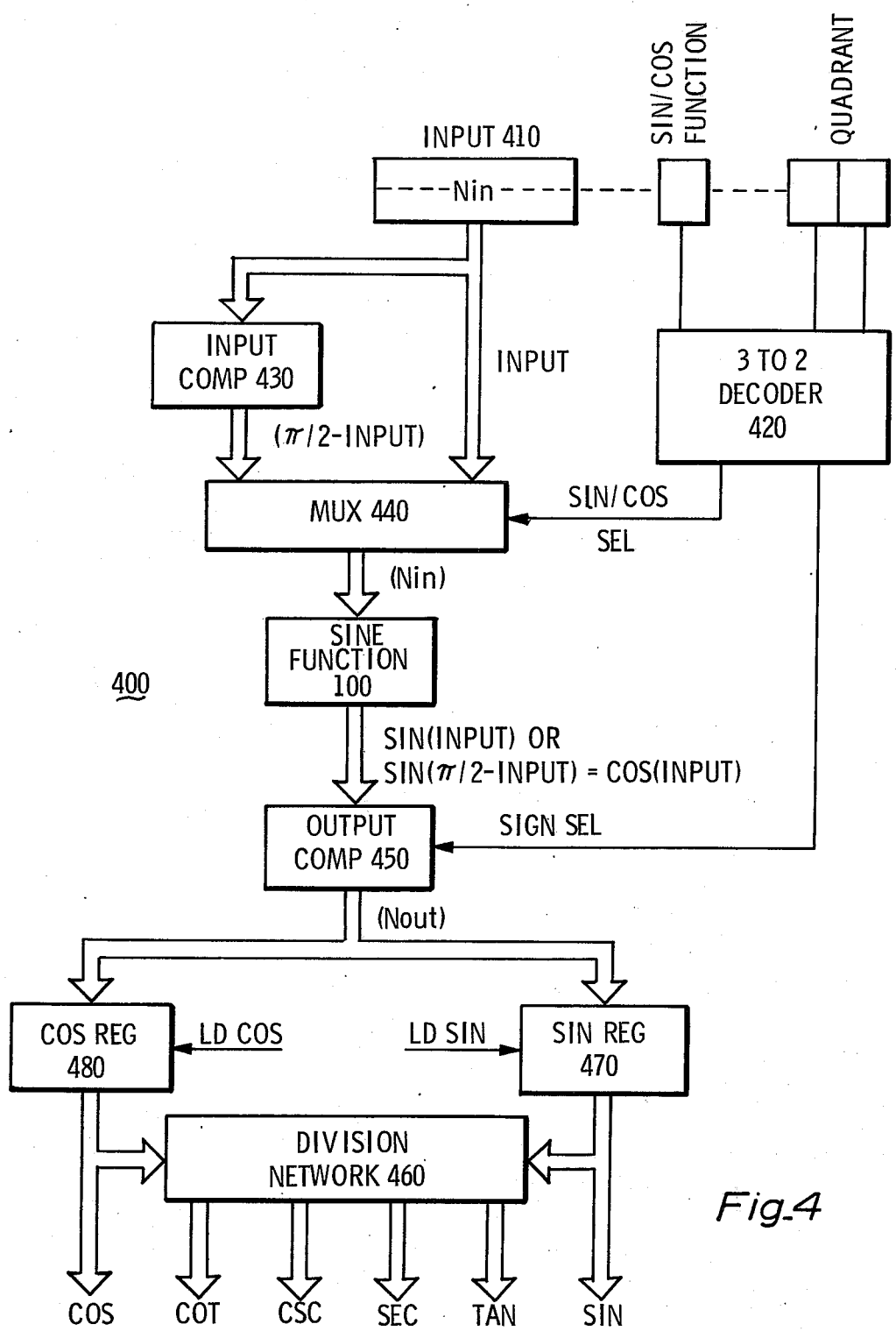
FIG. 4 is a block diagram of a general purpose trigonometric circuit which provides all six trigonometric functions from 0 to $2\pi$.

FIG. 4 shows general purpose circuit 400 which provides all six trigonometric functions from 0 to $2\pi$ based on sine function look-up tables (0 to $\pi/2$) in circuit 100 of FIG. 1. The input data at input 410 includes Nin (20 bits) plus a SIN/COS FUNCTION flag (1 bit) and a quadrant flag (2 bits). The flag bits are processed through a 3-to-2 decoder 420 to provide SIN/COS SEL and SIGN SEL. The SEL signals control the data flow to and from sine function circuit 100 permitting the single plus sine function of quadrant I to generate the:

+ cosine function for quadrant II,
− sine function for quadrant III, and
− cosine function for quadrant IV.

The cosine function for quadrants II and IV is obtained by generating ($\frac{1}{2}\pi$ − DATA INPUT) at input complimentor 430. Both DATA INPUT and ($\frac{1}{2}\pi$ − DATA INPUT) appear at MUX 440, one of which is then forwarded to sine function circuit 100 in response to SIN/COS SEL. The output of circuit 100 is either:

SIN(INPUT)

or

SIN($\frac{1}{2}\pi$ − INPUT) = COS(INPUT).

An output complimentor 450 provides the negative sine and cosine functions for quadrants III and IV in response to SIGN SEL.

The other trigonometric functions may be provided by division network 460 from the SIN(INPUT) held in sine register 470 and the COS(INPUT) held in cosine register 480.

Preferred Hardward for Four Subangle-Nin = 20 Embodiment

ROM 130 may be a 512 by 24 bit PROM (six NMI 6306) for accepting subangle A (9 bits) and providing 24 bits of output resoltuon.

ROM 140 may be a 512 by 16 bit PROM (four NMI 6306) for accepting A$pb$ (6 bits) and subangle B (3 bits) and providing 16 bits of output resolution.

ROM 150 my be a 512 by 12 bit PROM (three NMI 6306) for accepting A$pc$ (5 bits) and subangle C (4 bits).

ROM 160 may be a 512 by 8 bit PROM (two NMI 6306) for accepting A$pd$ (5 bits) and subangle D (4 bits).

The width of the ROMs decreases because $$SIN(A) >> COS(Apb + Aspmax)SIN(B) > COS(Apc + Ascmax)SIN(C) > COS(Apd + Asdmax)SIN(D)$$

which results in a progressively increasing number of leading zeros for the latter product terms. Further, a progressively increasing number of the LSBs in the latter product terms fall to the right of the truncation point and are therefore lost. Distributing Nin into the series of subangles not only reduced the number of address locations (or height) of each ROM as outlined in FIG. 2, but also reduces the number of significant binary places (or width) of each ROM as described above. The total reduction of ROM area (height X width) between the prior art and the present invention is:

Prior Art
(1,048,576 height) (24 bit width) = 25,165,824 bits
Present Invention
    First Term (512 height) (24 bit width) = 12,288 bits
    Second Term (512 height) (16 bit width) = 8,192 bits
    Third Term (512 height) (12 bit width) = 6,144 bits
    Fourth Term (512 height) (8 bit width) = 4,096 bits
    Present Invention Total = 30,720 bits $$\frac{\text{ROM Area Prior Art}}{\text{ROM Area Present Invention}} = \frac{25,165,824}{30,720} = 819.2$$

The 512 ratio established in connection with FIG. 2 relates to the address location ratio of the prior art ROM to the present invention ROMs.

Term adder 170 may be two partial sum adders (74283), each followed by a partial sum register (74174) connected in cascade with one total sum adder (74283).

Five Subangle Embodiment with Nin = 20

Increasing the number of subangles produces an additional term in the sine approximation algorithm (Eq. 1) requiring an additional ROM. However, the total address location requirement is reduced. For example, the 20 input bit could be distributed among five subangles as follows:

| A | B | C | D | E |
|---|---|---|---|---|
| 1-2-3-4-5-6-7-8 | 9-10 | 11-12-13 | 14-15-16 | 17-18-19-20 |

First Term - A has 8 bits
Second Term - B has 2 bits (Nb=2)
    Apb has 6 bits
    Apbmax has 2 bits
Third Term - C has 3 bits (Nc=3)

—continued

Apc has 5 bits
    Ascmax has 3 bits
Fourth Term - D has 3 bits (Nd=3)
    Apd has 5 bits
    Asdmax has 3 bits
Fifth Term - E has 4 bits (Ne=4)
    Ape has 4 bits
    Asemax has 4 bits A 256 ROM is required for each term, and the total address location is only 1280 (as opposed to the 2048 requirement of the FIG. 1 four-subangle embodiment). The preassigned value error of approximation three reduced because fewer binary places are rounded off in the earlier terms. The angle between error-free points (subangle A, 8 bits) is now:

$$\text{Error-free point spacing} = \frac{\frac{1}{2}\pi}{2^{Na}} = \frac{\pi}{2 \times 2^8} = \frac{\pi}{512}$$

The error-free point spacing may be reduced by using a larger ROM for the first term. If $Na = 10$ (requiring the first ROM to have 1024 locations) then subangle A (the error-free point spacing) is reduced to $\pi/2048$ radian, and the total ROM requirement is $1024 + 4 \times 256 = 2048$.

It will be apparent to those skilled in the art that various changes may be made in the described apparatus and technique without departing from the scope of the invention. For example, the contents of the ROMs in FIG. 1 may contain any single quadrant of the sine or cosine function. The input and output complimentors can be correspondingly controlled to develop the full circle of sine and cosine functions.

Accordingly, the scope of the invention should be determined only by the wording of the following claims and their equivalents.

I claim as my invention:

1. Apparatus responsive to a signal representation of an input angle (INPUT) having N$in$ binary places for providing a signal representation of an approximation of the function SIN(INPUT) having N$out$ bits, comprising:

input means for receiving the N$in$ binary places of INPUT and identifying a set of at least three progressively smaller subangles A, B, C ... LAST-1, and LAST formed by consecutive groups of sequential binary places such that:

$$INPUT = A + B + C + \ldots LAST\text{-}1, + LAST,$$

and $$INPUT > A > B > C \ldots LAST\text{-}1, > LAST;$$

a set of function generator means responsive to the input means, each of which provides a term of the approximate sine relationship:

$$SIN(INPUT) \approx SIN(A) + COS(A)SIN(B) + COS(A)SIN(C) + \ldots + COS(A)SIN(LAST-1) + COS(A)SIN(LAST);$$

and adder means responsive to each function generator for combining the terms therefrom to form the approximate sine relationship.

2. The apparatus of claim 1, wherein:
subangle A is the most significant subangle and is formed by the group of most significant bits (N$a$);

Subangle B is the next most significant subangle and is formed by the group of next most significant (N$b$);

Subangle ... ;

subangle LAST−1 is the next to least significant subangle and is formed by the group of next to least significant bits (N$last$ − 1) and Subangle LAST is the least significant subangle and is formed by the group of least significant bits (N$last$).

3. Apparatus responsive to a signal representation of an input angle (INPUT) having N$in$ binary places for providing a signal representation of an approximation of the function SIN (INPUT) having N$out$ bits, comprising:

input means for receiving the N$in$ binary places of INPUT and identifying a set of at least three progressively smaller subangles A, B, C . . . LAST − 1, and LAST formed by consecutive groups of sequential binary places such that:

INPUT = A + B + C + . . . LAST − 1, + LAST;

INPUT > A > B > C . . . LAST − 1,> LAST;

A = (the MSB of A) + (the remaining LSB of A) = A$p$ + A$s$;

and a set of function generator means responsive to the input means, each of which provides a term of the approximate sine relationship:
SIN(INPUT) ≈ SIN(A$p$ + A$s$) + COS(A$pb$ + A$sb$) SIN(B) + COS(A$pc$ + A$sc$) SIN(C) + . . . + COS(A$plast$ − 1 + A$slast$ − 1) SIN(LAST − 1) + COS(A$plast$ + A$slast$) SIN(LAST)

in which the A$p\_$ portion for subangles B through LAST is any group of the most significant bits of A, and the A$s\_$ portion for subangles B through LAST is at least the most significant bits of the remaining least significant bits of A; and adder means responsive to each function generator for combining the terms therefrom to the approximate sine relationship.

4. Apparatus responsive to a signal representation of an input angle (INPUT) having N$in$ binary places for providing a signal representation of an approximation of the function SIN(INPUT) having N$out$ bits, comprising:

input means for receiving the N$in$ binary places of INPUT and identifying a set of at least three progressively smaller subangles A, B, C . . . LAST − 1, and LAST formed by consecutive groups of sequential binary places such that:

INPUT = A + B + C + . . . LAST − 1 + LAST;

INPUT A > B > C . . . LAST − 1 > LAST;

A = (the MSB of A) + (the remaining LSB of A) = A$p$ + A$s$;

and a set of function generator means responsive to the input means, each of which provides a term of the approximate sine relationship:
SIN(INPUT) ≈ SIN(A$p$ + A$s$) + COS(A$pb$ + K$b$)SIN(B) + COS(A$pc$ + K$c$)SIN(C) + . . . + COS(A$plast$ − 1 + K$last$ − 1)SIN(LAST − 1) + COS(A$plast$ + K$last$)SIN(LAST)

in which the A$p\_$ portion for subangle B through LAST is any group of the most significant bits of A, and the K$\_$ is a constant having a predetermined value; and adder means responsive to each function generator for combining the terms therefrom to form the approximate sine relationship.

5. The apparatus of claim 4, wherein each predetermined constant value is equal to one of the end points of the range of values for the subangle associated therewith.

6. The apparatus of claim 4, wherein each predetermined constant value is equal to the maximum value of the range of values for the subangle associated therewith.

7. The apparatus of claim 4, wherein the approximate sine relationship is a monotonic relationship.

8. The apparatus of claim 4, wherein at least a portion of the function generator means in the set are memory look-up tables for the functions of the term associated therewith.

9. The apparatus of claim 8, wherein all of the function generator means in the set are ROMs forming a set of ROMs, ROM-A, ROM-B, ROM-C . . . ROM-Last − 1, and ROM-LAST, one ROM for each term of the approximate sine relationship.

10. The apparatus of claim 9, wherein:

ROM-A provides the first term SIN(A) and has two to the N$a$ address locations;

ROM-B provides the second term COS(A$pb$ + A$sb$-max)SIN(B) and has two to the (N$apb$ + N$b$) address locations;

ROM-C provides the third term COS(A$pc$ + A$sc$-max)SIN(C) and has two to the (N$apc$ + N$c$) address locations; . . .

ROM-LAST-1 provides the LAST − 1 term COS-(A$plast$ − 1 + A$slast$ − 1max)SIN(LAST − 1) and has two to the (N$aplast$ − N$last$) address locations; and ROM-LAST provides the LAST term COS(A$plast$ + A$slastmax$) SIN(LAST) and has two to the (N$aplast$ + N$last$) address locations.

11. The apparatus of claim 10, wherein the number of bit places in each of the ROMs progressively decreases according to the relationship:

ROM-A bits > ROM-B bits > . . . > ROM-LAST bits to eliminate leading zeros generated by the decreasing significance of the product terms therefrom.

12. The apparatus of claim 9, wherein the ROMs are PROMs.

13. The apparatus of claim 12, wherein the input means is hardwired to the appropriate ROMs to present the binary places of each subangle to the appropriate ROMs.

14. The apparatus of claim 13, wherein the hardwired ROm inputs are distributed so that:

N$a$ >> N$b$ ≦ N$c$ ≦ N$d$.

* * * * *

UNITED STATES PATENT AND TRADEMARK OFFICE
CERTIFICATE OF CORRECTION

PATENT NO. : 4,077,063
DATED : February 28, 1978
INVENTOR(S) : Thomas P. Lind

It is certified that error appears in the above-identified patent and that said Letters Patent are hereby corrected as shown below:

Col. 2, line 18, "ae" should be --are--.

Col. 3, line 30, after "LAST" insert --10--.

Col. 3, line 33, insert --1 + -- after "- LAST".

Col. 9, line 41, after "to" insert --form--.

Col. 10, line 39, insert --ROM - -- after ";".

Col. 10, line 42, "(Naplast - Nlast)" should be -- (Naplast -1 + Nlast)--

Signed and Sealed this

Twentieth Day of June 1978

[SEAL]

Attest:

RUTH C. MASON
Attesting Officer

DONALD W. BANNER
Commissioner of Patents and Trademarks